Patented Nov. 29, 1949

2,489,332

UNITED STATES PATENT OFFICE 2,489,332

PREPARATION OF AN IRON-FREED ACID-TREATED KAOLIN CATALYST

Hubert A. Shabaker, Media, Pa., assignor to Houdry Process Corporation, Wilmington, Del., a corporation of Delaware No Drawing. Application April 30, 1946, Serial No. 666,177

6 Claims. (Cl. 252—450)

The present invention relates to the preparation of adsorptive contact masses from natural argillaceous materials and is chiefly concerned with the production of contact masses useful as catalysts particularly in hydrocarbon conversion.

Natural products having chiefly the chemical constitution of aluminum hydrosilicates have been employed in the arts, because of their adsorbent capacities, for decolorizing and clarifying liquids such as petroleum oils. Such materials as fuller's earth and certain bentonite clays find extensive use for this purpose particularly after activation in known manner such as by means of preliminary acid treatment. Adsorbent contact masses comprising gels of silica and alumina in intimate association have also been produced by synthetic methods involving precipitation or coprecipitation of these materials. Such synthetic contact masses as well as acid-activated clays having substantial cracking activity are extensively employed as catalysts in hydrocarbon conversion processes and, in fact, these constitute the principal materials for the purpose in current commercial operations.

There are certain readily available and cheap clays, including for instance those which contain kaolinite as the characteristic clay mineral constituent, which do not respond to acid treatment to produce adsorbents having bleaching or decolorizing properties of desired high activity levels, and although such clays may exhibit catalytic activity sufficient to warrant interest, they have not entered into significant commercial use in hydrocarbon cracking because their cracking activities are comparatively low and/or they also tend to produce disproportionate quantities of coky deposit compared to the yield of desired cracked liquid products including gasoline.

The value of a contact mass in catalytic cracking of hydrocarbon materials depends to a large extent upon its selectivity in producing from a charge stock high or acceptable yields of desired liquid products such as motor fuel with relatively low production of by-product gas and coke, particularly the latter. Although gaseous by-products can be usefully employed as charge to polymerization, alkylation or other processes, it is nevertheless generally preferable to employ catalysts having an inherent tendency to produce high ratios of normally liquid to gaseous products, since, even with such catalysts higher yields of gaseous products can be obtained, if desired, by the control of the severity of cracking conditions. The coky deposit formed in a cracking operation, however, represents loss of charge to products that are not essentially recoverable, and the reduction of the quantity of this product even as to small changes in ratio of coke produced to gasoline yield are highly significant in the consideration of the economics of commercial operation.

The inherent catalytic properties of a catalyst with respect to comparative coke and gas making tendencies as well as its ability to produce cracked liquid products are determinable by test carried out under standardized conditions. One such test in current use is that known as the "CAT-A" method, described in "Laboratory method for determining the activity of cracking catalysts" by J. Alexander and H. G. Shimp, page R–537, National Petroleum News, August, 2, 1944. In accordance with that method, a light gas oil is subjected to contact with the catalyst under fixed cracking conditions and the activity index of the catalysts is expressed in terms of volume per cent of obtained gasoline; the weight per cent of wet gas, specific gravity of the wet gas, and the weight per cent of carbonaceous deposit are also determined. Notations of catalyst activity in the present specification have reference to that determined by the above test.

Although acid-activated bentonite clays of high cracking activity as well as synthetic silica-alumina gels are currently employed in commercial processes of hydrocarbon conversion, these synthetic catalysts offer advantages from the standpoint of higher ratios of gasoline formed to coke deposited, superior stability particularly in use with stocks causing abnormal loss of catalytic activity, and better performance characteristics in the motor fuel produced.

It has now been found that improved contact masses can be prepared by extracting clay with acid to an extent at least sufficient to dissolve a substantial portion of the aluminum content of the clay and reincorporating in the residual clay mass an aluminum product recovered from the acid extract liquor. In accordance with the present invention active catalysts demonstrating generally the desirable characteristics of synthetic catalysts comprising silica and alumina can be produced by reprecipitating dissolved aluminum from the acid extract liquor using a soluble silicate compound, preferably an alkali metal silicate, as the precipitating agent, advantageously with suitable adjustment of the pH if it need be or the addition of a setting agent or agent accelerating gel formation. As a result of this procedure, the aluminum content of the acid extract liquor is redeposited on the residual clay mass as a component of a combined silica-alumina gel or hydrated aluminum silicate, and an active, economical catalyst is thus prepared.

Since most clays also contain in addition to silica and alumina smaller proportions of compounds of other metals principally such as those of iron, calcium and magnesium, portions of these metal compounds will also be extracted with the aluminum compound in the acid-treating liquor. The composition of the gel or precipitate to be incorporated with the clay mass can therefore be readily controlled by purification of the acid liquor to desired extent to remove undesired metal compounds therefrom. For instance, preferred catalysts can be prepared by purification of the acid liquor to free the same of its iron components particularly, since iron compounds have been found deleterious in contact masses such as cracking catalysts. Such processes involving direct purification of the acid extract liquor are more particularly described and claimed in copending applications Serial No. 666,179, filed April 30, 1946 and Serial No. 679,730, filed June 27, 1946.

The raw product employed as starting material may be any argillaceous substance of the nature of clay having chiefly the composition of hydrosilicates of alumina and is not limited to clays such as the sub-bentonites which are activated by acid to high level of activity. It has been found that relatively inactive clays and those which are not activatable to the extent of the clays conventionally employed in decolorizing or as cracking catalysts, such as those commonly designated as kaolins, can be brought to acceptable levels of activity with good performance characteristics, by treatment as herein described.

Although in some processes of hydrocarbon conversion, as in the so-called "fluidized bed" operation, catalyst in the form of finely divided powder has been employed in other types of operations, including those using a fixed or moving catalyst bed, particles or pieces of larger dimension as in the form of aggregates or other unitary masses of discrete and uniform size and shape are preferred. The present invention accordingly includes contact masses prepared as fine powders as well as such masses of larger size. If the catalyst is to be molded, extruded or otherwise formed into aggregates or pieces, the forming operation may be carried out on the raw clay or a finely divided clay may be acid-treated as herein described, and then formed or shaped. The alumina from the said liquor is deposited in either case on the formed clay residue. Since heat treatment is required to enable the clay to retain its shaped form during acid treatment, this sequence is conveniently resorted to in instances where the clay to be used as starting material has been calcined previous to acid-treatment, in air or in the presence of hydrogen sulfide or other reactive gases. Not only is better acid extraction obtained as a result of the pre-calcination but preforming of the clay also offers the added convenience in separation of the acid treat liquor from the clay residue with greater facility, which is of particular advantage when impurities such as iron salts are to be removed from that liquor by precipitation methods, as will hereinafter appear.

It is preferred, however, to defer the forming step until after the acid-leached clay residue has been reincorporated with the aluminum compound precipitated from the acid liquor. This modification of the process offers certain procedural advantages that come into consideration. The clay can then be readily acid treated, and water washed if desired, while in finely divided form and the precipitation of the aluminum, with or without previous purification of the acid liquor, can be effected in the presence of a continuous stream of clay suspended in the acid treat liquor, the soluble silicate or other precipitating agent being injected continuously into the stream. Alternatively, if the acid treat liquor is separated from the clay residue, as for the precipitation and removal of undesired impurities such as iron, both that liquor and the soluble silicate solution may be injected into a stream of clay suspension or slurry. The precipitation of the alumina in the presence of the clay suspension in accordance with these embodiments can be employed to advantage with the type of continuous mixer and extruding head described in my U. S. Patent 2,370,200, issued February 27, 1945.

The extent of the acid treatment of the clay governed by such factors as concentration, time and temperature, may be varied over a wide range but should be sufficient at least to extract substantial quantities of alumina. As the acid treatment of a clay is progressively extended as measured by the quantity of alumina removed from the clay, the catalytic cracking activity of the clay is enhanced until a point of maximum or optimum activity of the clay residue is reached, beyond which, no further improvement in activity characteristics is obtained on continued acid treatment, and in fact, the activity of the clay residue may decline on further acid treatment. The extent of acid treatment in accordance with the present invention, however, is not limited by these considerations of the activity of the obtained clay residue, since the activity of the acid treated clay residue does not necessarily determine the activity of the finished catalyst containing the redeposited alumina. Catalysts showing substantial improvement in activity over the original or acid treated clay are obtained by the described procedure whether the acid treatment is carried out short of, up to or considerably beyond that which produces optimum cracking activity of the clay residue alone. Composite catalysts having improved gasoline/coke ratios are already obtained with a mild acid treatment removing as little as 1% of the aluminum content of the clay. Catalysts of high activity levels may be obtained even from clays having a high content of alumina, by the removal and redeposition of 90% or more of the original aluminum content. It accordingly appears that the invention is not limited to any particular extent of the acid treatment and includes treatments effecting substantially complete extraction of the alumina. As a general rule with most clays excellent composites are readily obtained when the acid treatment is carried out to remove more than 5% and up to about 80% of the original aluminum content of the raw clay.

The rate at which alumina is extracted from a particular clay by the acid, as will readily be understood, will depend upon the kind of acid used, the dilution of the acid, the ratio of acid to clay, the temperature of treatment, and to a lesser extent upon other operating variables, the treatment being continued for the required time to effect the desired extraction. Acid treatment may be effected by but is not restricted to methods similar to those employed in known processes for "acid activation" in the manufacture of decolorizing clays. For instance concentrated mineral acid such as hydrochloric or sulfuric may be added to an aqueous suspension of clay or dilute acid may be added directly to the raw or dried clay. In known acid activation the weight ratio of acid to dry clay may be from about 20% to 100% (anhydrous acid basis) and in the present invention even higher ratios may be employed, but ratios in the order of 30 to 60% are preferred. The treatment of the clay with the acid is preferably carried out at elevated temperature as at about 160° F. to about the boiling point of the acid mixture. Although organic acids such as acetic or oxalic may be employed, mineral acid is preferred particularly if it is desired to remove relatively large quantities of alumina from the clay. The clay may be permitted to soak in the acid or any known or desired leaching or extracting procedure may be employed. If the clay is washed with water after acid treatment, the washwater may be combined with the acid extract liquor for recovery of its content of aluminum compound, or if successive water washes are employed, the filtrates of one or more of the later washes may be discarded or used for dilution of concentrated acid used in the succeeding batch as may be desired.

Separation of the acid treated clay residue and the acid extract liquor is unnecessary, since the precipitant for the aluminum may be added directly to the mixture with suitable agitation to obtain uniformity of reaction. If the acid liquor is to be purified and the method of purification requires it, separation of the acid liquor from the clay residue may be accomplished in any known or desired manner, as by filtration or decantation. The precipitant for the aluminum compound in the acid liquor is a silicate, preferably a soluble silicate such as an alkali metal silicate, which forms therewith a gel or precipitate under appropriate pH conditions which is designated variously as hydrous silica-alumina or aluminum hydrosilicate. In order to effect faster setting of the gel or precipitate, the reaction should be effected at a pH of about 5 to 10 or preferably at or above neutrality. To obtain the desired pH, the proportion of alkaline silicate added may be suitably chosen or the desired condition may be obtained by the addition of acid or alkaline reacting materials as required. The additional agent accelerating setting of the gel may be advantageously volatile or contain a volatile cation as for example ammonia or ammonium sulfate. The amount of silicate added may be varied over a wide range, but is preferably at least sufficient to furnish substantially a weight ratio of $SiO_2/Al_2O_3$ in the precipitate of 60/40, irrespective of the $SiO_2/Al_2O_3$ ratios of the original raw clay or the acid treated clay residue. Proportions of silicate giving a ratio of $SiO_2/Al_2O_3$ in the precipitate in excess of about 95/5 resulted in little or no improvement in activity of the acid treated clay.

The silica-alumina gel or precipitate is incorporated in the clay residue as a result of its formation in the presence of such residue, however, if the precipitation is carried out on acid extract liquor separated from the clay residue, the incorporation to form the composite may be achieved by thorough admixture of the clay residue in finely divided form with the wet or dried precipitate, for instance by milling the two together to obtain substantially uniform admixture.

Instead of purifying the acid liquor to remove iron salts or other impurities, contact masses of low iron content can also be prepared by employing for source of the alumina, clay residues in which at least a portion of the iron content has been already removed. Thus, a raw clay may be initially treated with acid for a short time and the first one or more extracts, which will contain the major portion of extractable iron, be discarded, so that further acid extraction will result in an aluminum liquor fairly low in iron impurities. If desired, even the more intimately associated and difficultly removable iron may be set free in the clay structure by treatment with a reactive gas forming iron salts, such as hydrogen sulfide for instance with or without a preliminary acid treatment, so that the iron content is readily extracted by even mild acid leaching as disclosed in copending applications Serial Nos. 644,421, now U. S. 2,466,046, 644,422, now U. S. 2,466,047, and 644,423, now U. S. 2,466,048, filed January 30, 1946.

The composite of clay and silica-alumina obtained in accordance with any of the above procedures may be made into a catalyst or other contact mass and finished in any known or desired manner which may include in any order of sequence washing, drying and, if desired, forming into required shapes and sizes. Masses substantially free of alkali metal may be obtained by washing the composites, preferably after drying, with acidic solutions or solutions of ammonium salts. For catalyst use the composite should be finally calcined at a temperature in excess of 500° F. in air or steam or in mixtures of the same, although, if desired, the calcination step may be effected in the use of the catalyst incident to the high temperatures encountered in hydrocarbon conversion processes and regeneration of the catalyst.

Agglomerated masses or pieces of the composite contact mass may be formed by suitably breaking up a dried filter cake, or more regular sizes and shapes may be obtained by dry tableting or by molding including casting or extruding of the wet or wetted comminuted material. If desired, the clay residue in finely divided form may be incorporated with a hydrosol formed from the aluminum in the acid extract liquor and the composite set as droplets in a static or turbulent water immiscible liquid to produce contact masses of the "bead" type.

The contact masses prepared in accordance with the present invention find use generally where absorbent clays or dried gels comprising silica-alumina have been employed. As catalysts in hydrocarbon conversion and treating processes these products can be beneficially and profitably substituted in processes employing clay or synthetic silica-alumina, including such processes as cracking, reforming, polymerizing and desulfurizing of hydrocarbons and hydrocarbon oils. Inactive clays, such as kaolins, when treated in accordance with the present invention, become available for beneficial use as catalysts such as in the processes above-named as well as in decolorizing, adsorbing and filtering materials for gases and liquids, as for instance in decolorizing oils or in adsorption of gasoline or other volatile hydrocarbons from natural gas.

Example I

A sample of raw kaolin clay from Eccles property, Putnam County, Florida, was ground in a ball mill with sulfuric acid of about 10 volume percent dilution (17% by weight) at room temperature for 6 to 7 days employing 368 parts by weight of concentrated acid (96.5%) diluted with 1800 parts of water per kilogram of clay. A portion of the obtained clay suspension amounting to about 405 parts by weight was diluted with a substantially equal weight of water and the diluted suspension poured with stirring into sufficient sodium silicate solution, "N-Brand,"

$$[Na_2O(SiO_2)_{3.22}]$$

to furnish 135 parts by weight of $SiO_2$ diluted with 3000 parts of water. After complete mixing, the addition of 106 parts of 10% ammonium sulfate solution caused a gel to set, which had a pH of 9.1. This material was broken up and oven dried slowly at an average temperature of 180° F. The dried gel was crushed and washed four times with water. After this step, the material was treated with 10% $NH_4Cl$ solution to base exchange zeolytically held salts and then water washed until chloride free. The washed material was oven dried over night at 212° F. The dried mass was then ground in a ball mill four hours and 204 parts of the ground material mixed with 223 parts of water and cast into pellets which were oven dried.

The obtained pellets were calcined at 1400° F. for 10 hours in the presence of 5% steam and tested for catalytic activity in the crackling of a light gas oil by the "CAT-A" method. There was obtained 27.8% by volume of gasoline based on the volume of the charge with the production of 1.1% by weight of coke and 3.5% by weight of gas having a specific gravity of 1.25. The excellent gasoline/coke ratio is indicative of the behavior of the catalyst and demonstrates its superior properties in the cracking of heavy stocks.

The raw clay employed in this example had substantially the following analysis by weight on an ignited basis (containing 10–20% sand): 65.8 $SiO_2$, 32.4 $Al_2O_3$, 1.4 $Fe_2O_3$, 0.23 CaO, 0.21 MgO, 0.69 $TiO_2$.

The silica-alumina ratio in the clay residue after acid treatment was about 70:30. The proportion of clay residue to the synthetic gel in the composite was 43.5:56.5, the synthetic containing 96.2% $SiO_2$: 3.8% $Al_2O_3$.

Example II

A raw kaolin clay from Putnam County, Florida, known commercially as "Edgar EPK" was milled with hydrochloric acid of 20% dilution employing about 1318 parts by weight of the dilute acid per 1000 parts of clay (25% HCl to dry clay on anhydrous basis) and then heated on a steam bath for about one-half hour, diluted and filtered. The filtrate was discarded and after washing the filter cake 1098 parts of 20% HCl added and the mix subjected to heating on the steam bath, being continued for six days. The obtained thick slurry was diluted with water so that clay solids amounted to approximately ⅓ of the slurry.

655 parts of the slurry and about 1029 parts by weight of 10% $NH_4Cl$ solution were added simultaneously with stirring into sodium silicate solution, "N-Brand," to furnish 147 parts of $SiO_2$ diluted with 4000 parts of water. Gelation occurred during admixture; the final pH of the mixture being 7.5. The filtered material was oven dried over night and then treated with 10% $NH_4Cl$ solution and water washed until chloride free. The washed and dried material was ball mill ground, mixed with water, cast into pellets and dried at 200° F.

The obtained pellets were calcined as in the preceding example and similarly tested in the cracking of a light gas oil. There was obtained 41.0% by volume of gasoline on volume of charge stock with the production of 2.7% by weight of coke and 8.6% by weight of gas of 1.52 specific gravity.

The raw clay employed in this example had the following analysis by weight on a dry (105° C.) sand-free basis:

| | Percent |
|---|---|
| Ignition loss | 12.9 |
| $SiO_2$ | 46.6 |
| $Al_2O_3$ | 38.8 |
| $Fe_2O_3$ | 1.0 |
| CaO | 0.44 |
| MgO | 0.23 |
| $TiO_2$ | 0.35 |
| Alk. Metal (as oxides) | 0.52 |

The clay residue after acid treatment contained 67% $SiO_2$: 33% $Al_2O_3$. The clay residue and synthetic gel were composited in the proportions of 47.1/53.1, the synthetic containing 85% $SiO_2$: 15% $Al_2O_3$.

Example III

Eight parts by weight of a dry ground bentonite clay from Montgomery County, Alabama, heated to 150° F. were added, slowly enough to maintain the 200° F. temperature of acid solution, to a sulfuric acid solution containing 4.15 parts of concentrated $H_2SO_4$ (96.5%) and 27.8 parts of water. During the twelve hour treat approximately 8 parts of water were added to the agitated (by hot air) mixture to maintain the liquid level. After cooling for one and one-half hours, the material was filtered and washed, batchwise, with 16 parts of water each time for six times.

A portion of the acid filtrate combined with wash water liquor was treated with strong caustic solution at 85° C. for 30 to 45 minutes. The precipitate formed, which was composed chiefly of iron compounds, was removed by filtration.

A portion of the iron-freed filtrate containing .57 parts of $Al_2O_3$ were combined with 12.5 parts of the clay filter cake described in the first paragraph above. To this slurry was added a sodium silicate solution (14.5 parts "N-Brand") containing 4.15 parts of $SiO_2$. The addition to this stirred mixture of 131 parts of a 1.141 sp. gr. solution of $(NH_4)_2SO_4$ caused gelation at a pH of 9.5.

This gelatinous material was filtered and fast dried at 240° F. for 2½ hours. The dried material was then washed ten times with water, treated four times with $NH_4Cl$ solution and washed chloride free. The washed material was oven dried, ground for 3 hours and then mixed for 45 minutes with about an equal quantity by weight of water, cast into pellets and dried.

The pellets were calcined as in the preceding examples and similarly employed in cracking of a light gas oil, obtaining 35% gasoline on volume of charge with the production of 1.8% by weight of coke and 4.1% by weight of gas of 1.47 specific gravity.

The raw bentonite clay employed in this example had the following analysis by weight on a dry (105° C.) basis:

| | Percent |
|---|---|
| Ignition loss | 8.21 |
| $SiO_2$ | 60.9 |
| $Al_2O_3$ | 19.3 |
| $Fe_2O_3$ | 4.52 |
| $Na_2O$ | 0.13 |
| CuO | 0.0013 |
| CaO | 1.65 |
| MgO | 4.87 |

The ratio of $SiO_2$: $Al_2O_3$ in the acid treated clay residue was about 81/19. There was present in the composite 66 parts of clay to 34 parts of synthetic silica-alumina gel formed, the synthetic having a ratio of 87.5 $SiO_2$: 12.5 $Al_2O_3$.

*Example IV*

The process of Example I on the same clay was repeated, employing 10% hydrochloric acid (approximately 2 parts of acid to 1 of clay) and a gel precipitated in the presence of the clay at pH of 8.7 employing sodium silicate with the addition of ammonium hydroxide. The acid treated clay residue contained 68% $SiO_2$: 32% $Al_2O_3$ and the formed gel 96% $SiO_2$: 4% $Al_2O_3$, the proportion of clay residue to gel being 60:40. After calcination in the same manner as Example I, the composite tested in the cracking of a light gas oil by the "CAT-A method" obtained 27.0% of gasoline on volume of charge with 0.9% by weight of coke and 2.7% by weight of gas of 1.25 specific gravity.

*Example V*

Four parts of the kaolin clay of Example II were treated with about 8.8 parts by weight of 20% HCl acid solution on a steam bath for one hour—the material being stirred for the first 10 minutes. After removal from the steam bath, about 1.6 parts of water were added and the material filtered. Two parts of water were added to the top of the filter cake and allowed to drain through over night.

A portion of the filtrate (containing 5.42 gms./L $Al_2O_3$) was partially neutralized with ammonium hydroxide (concentrated) and combined with part of the acid treated clay in proportions giving 140 parts of dry clay to 1.87 parts of $Al_2O_3$ in the filtrate. The obtained gel mixture was added with 408 parts of 10% $NH_4Cl$ solution to a stirred dilute solution of sodium silicate containing 100 parts of $SiO_2$. This material was filtered, washed and purified in the manner described in the preceding examples. The washed and dried powder was mixed with water, cast, dried and calcined as above. Catalytic activity test showed the production of 27.1% by volume of gasoline, with 1.0% by weight of coke and 3.2% by weight of gas of 1.34 specific gravity.

The above acid treated clay residue contained about 55 $SiO_2$:45 $Al_2O_3$, 54 parts of clay being employed with 46 parts of synthetic gel having about 98% $SiO_2$/2% $Al_2O_3$.

Instead of the particular brand of alkali metal silicate specifically referred to in the above examples, other soluble silicates may be employed as precipitant for the alumina, such as a solution of sodium metasilicate ($Na_2SiO_3 \cdot 5H_2O$), the quantity employed being of course modified appropriately in accordance with the silica content of the particular reagent selected.

Although it is preferred to coprecipitate the silica-alumina gel in the presence of the acid-treated clay residue as described, the invention is not limited thereto since either of the components forming the silica-alumina gel may be first incorporated separately with the acid treated clay residue followed by the other. For instance, the acid-treated clay residue containing adsorbed aluminum salts from the extract liquor may be treated with a soluble silicate solution. It is also within the scope of the present invention to incorporate in the composite of clay and silica-alumina gel other metal compounds such as oxides of beryllium or zirconium, or further quantities of alumina in addition to that derived from the clay extraction.

Obviously many modifications and variations of the invention as hereinbefore set forth may be made without departing from the spirit and scope thereof and therefore only such limitations should be imposed as are indicated in the appended claims.

I claim as my invention:

1. Process of forming adsorbent contact masses from clay containing iron and aluminum compounds, which comprises treating the clay with a gas reactive to form iron salts with iron compounds present in the clay, leaching the treated clay with dilute acid for a short period to remove iron compounds therefrom, discarding the acid liquor containing dissolved iron compounds, further acid treating the resulting clay residue to an extent at least sufficient to dissolve a substantial quantity of the aluminum content of the clay thereby forming an acid extract containing aluminum as a salt of the acid employed, and precipitating an aluminum product by reaction of the acid extract with an alkali metal silicate in the presence of the clay residue obtained by the acid treatments.

2. Process of forming adsorbent contact masses from clay containing iron and aluminum compounds, which comprises mildly treating the clay with acid to extract iron compounds therefrom, discarding the iron containing solution thus obtained, further acid treating the clay to an extent at least sufficient to dissolve a substantial quantity of the aluminum content of the clay leaving a clay residue comprising undissolved aluminum compounds and forming an acid extract containing dissolved aluminum as a salt of the acid employed, and compositing the resulting acid treated clay residue with the product formed by reaction of the aluminum-containing acid extract with a soluble silicate.

3. Process for forming catalytic contact masses from kaolin containing iron and aluminum compounds, which comprises treating said kaolin with hydrogen sulfide gas to convert the iron compounds therein to sulfides, leaching the thus sulfided kaolin with acid to extract the iron sulfides, discarding the obtained acid extract, further acid treating the kaolin to dissolve a substantial portion of the aluminum content of the kaolin leaving an undissolved kaolin residue, and recombining with the undissolved kaolin residue at least a portion of the dissolved aluminum in a form modified by reaction of alkali metal silicate with such dissolved aluminum.

4. Process in accordance with claim 2 wherein the several acid treatments recited are carried out to an extent sufficient to remove more than 5% and up to 80% of the aluminum content of the clay.

5. Process in accordance with claim 2 wherein the clay subjected to treatment with acid is a kaolin.

6. Process in accordance with claim 2 wherein a preformed mass of kaolin in calcined condition is subjected to acid treatment as defined.

HUBERT A. SHABAKER.

REFERENCES CITED

The following references are of record in the file of this patent:

UNITED STATES PATENTS

| Number | Name | Date |
|---|---|---|
| 1,133,446 | Richter | Mar. 30, 1915 |
| 1,570,353 | Jacobssen | Jan. 19, 1926 |
| 1,727,441 | Parentani | Sept. 10, 1929 |
| 1,953,144 | Wilson | Apr. 3, 1934 |
| 2,088,281 | Smith | July 27, 1937 |
| 2,320,799 | Ruthruff | June 1, 1943 |
| 2,326,706 | Thomas et al. | Aug. 10, 1943 |
| 2,374,313 | Veltman | Apr. 24, 1945 |
| 2,388,302 | Weyl | Nov. 6, 1945 |
| 2,395,198 | Schulze | Feb. 19, 1946 |
| 2,402,668 | Roller | June 25, 1946 |
| 2,408,207 | Garrison et al. | Sept. 24, 1946 |